United States Patent
Dailly et al.

(10) Patent No.: US 10,751,694 B2
(45) Date of Patent: Aug. 25, 2020

(54) METAL ORGANIC FRAMEWORK (MOF) STRUCTURED OBJECT AND METHOD

(71) Applicant: GM GLOBAL TECHNOLOGY OPERATIONS LLC, Detroit, MI (US)

(72) Inventors: Anne M. Dailly, West Bloomfield, MI (US); Fang Dai, Troy, MI (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 157 days.

(21) Appl. No.: 15/880,976

(22) Filed: Jan. 26, 2018

(65) Prior Publication Data

US 2019/0232251 A1    Aug. 1, 2019

(51) Int. Cl.
| | | |
|---|---|---|
| C08G 83/00 | (2006.01) | |
| B01J 20/26 | (2006.01) | |
| B01D 69/14 | (2006.01) | |
| B01J 31/22 | (2006.01) | |
| B01D 67/00 | (2006.01) | |
| B01D 71/36 | (2006.01) | |

(Continued)

(52) U.S. Cl.
CPC ........ *B01J 20/261* (2013.01); *B01D 67/0079* (2013.01); *B01D 69/141* (2013.01); *B01D 69/148* (2013.01); *B01D 71/36* (2013.01); *B01J 20/226* (2013.01); *B01J 20/28033* (2013.01); *B01J 20/3085* (2013.01); *B01J 31/06* (2013.01); *B01J 31/1691* (2013.01); *B01J 31/2239* (2013.01); *B01J 35/0006* (2013.01); *B01J 35/02* (2013.01); *B01J 37/031* (2013.01); *B01J 37/04* (2013.01); *H01M 10/052* (2013.01); *H01M 10/0565* (2013.01); *B01D 71/028* (2013.01); *B01J 35/04* (2013.01); *B01J 2531/0219* (2013.01); *B01J 2531/16* (2013.01); *C08G 67/00* (2013.01); *C08G 79/00* (2013.01); *C08G 83/001* (2013.01); *C08L 73/00* (2013.01); *C08L 85/00* (2013.01); *C08L 87/00* (2013.01); *H01M 2/145* (2013.01); *H01M 2/166* (2013.01)

(58) Field of Classification Search
None
See application file for complete search history.

(56) References Cited

PUBLICATIONS

Rungta, M. et al., "Membrane-Based Ethylene/Ethane Separation: The Upper Bound and Beyond". AIChE J. 2013, 59(9), 3475-3489. (Year: 2013).*

* cited by examiner

*Primary Examiner* — Richard A Huhn
(74) *Attorney, Agent, or Firm* — Quinn IP Law

(57) ABSTRACT

A method of making a metal organic framework (MOF)-polymer composite material includes forming a homogeneous solution comprising a solvent, a metal salt, a polymer which is soluble in the solvent, and a reactant which can be synthesized to provide an organic linker during formation of a MOF structure, synthesizing the homogeneous solution to crystallize a MOF structure in the homogenous solution to yield the MOF structure distributed in a remainder solution, applying an antisolvent to the remainder solution with the MOF structure distributed in the remainder solution to form a polymer-rich phase, where the MOF structure is integrated into the polymer matrix during forming of the polymer matrix to produce a MOF-polymer composite material. The MOF-polymer composite material can be formed on a substrate to produce a MOF structured object, which can be a membrane, film, or other object.

20 Claims, 2 Drawing Sheets

(51) Int. Cl.
*B01J 20/22* (2006.01)
*B01J 20/28* (2006.01)
*B01J 20/30* (2006.01)
*B01J 31/06* (2006.01)
*B01J 31/16* (2006.01)
*B01J 35/00* (2006.01)
*B01J 35/02* (2006.01)
*B01J 37/03* (2006.01)
*B01J 37/04* (2006.01)
*H01M 10/052* (2010.01)
*H01M 10/0565* (2010.01)
*H01M 2/14* (2006.01)
*H01M 2/16* (2006.01)
*B01J 35/04* (2006.01)
*B01D 71/02* (2006.01)
*C08L 87/00* (2006.01)
*C08L 73/00* (2006.01)
*C08L 85/00* (2006.01)
*C08G 67/00* (2006.01)
*C08G 79/00* (2006.01)

METAL ORGANIC FRAMEWORK (MOF) STRUCTURED OBJECT AND METHOD

INTRODUCTION

The present disclosure relates to a metal organic framework (MOF) structured object made of a composite material including a MOF structure distributed in a polymer phase, and a method of making a MOF structured object including forming a composite material including a MOF structure distributed in a polymer phase.

BACKGROUND

Crystallization of metal organic frameworks (MOFs) almost exclusively leads to polydisperse microcrystalline powders. The polydisperse characteristic of the microcrystalline MOF powder limits applicability of MOF powder in applications such as energy storage, separations, catalysts, sensing materials, etc. Shaping the MOF into an object can require the addition of a binder material and/or the application of pressure for densification of the MOF object. For example, when cast or molded into a thin object, such as a film or membrane, the surface smoothness and/or surface finish of the thin object is difficult to control, and/or the surface of the thin object can be rough due to variation in the size of the particles of the included MOF powder, and non-uniform distribution of the variably sized MOF particles in the thin object. Crystalline MOF particles are brittle in nature with a high fracture tendency, such that, when mixed into a polymer, for example, prior to casting and drying the polymer-MOF mixture into an object such as a film or membrane, the crystalline MOF particles can fracture into different sizes which can contribute to non-uniform mixing of MOF particles in the polymer during casting and to non-uniform distribution of MOF particles in the film or membrane formed from the polymer-MOF mixture. The non-uniformity of the mixture and the variation in distribution, size, and morphology of the MOF particles in the cast object can cause a lack of homogeneity in the properties and characteristics of the resultant thin object.

SUMMARY

A method of making a metal organic framework (MOF)-polymer composite material which can be formed as a macroscopically metal organic framework (MOF) structured object such as a membrane or a film, and a metal organic framework (MOF) structured object made by the method, is described. In one example, a method of making a metal organic framework (MOF)-polymer composite material includes forming a homogeneous solution by combining a MOF mother liquor and a polymer solution, and synthesizing, via crystallization of the homogeneous solution, a MOF structure in the homogenous solution. Crystallization of the MOF structure in the homogeneous solution yields the MOF structure distributed in a remainder solution. The method further includes demixing the remainder solution to form a polymer-rich phase, where the distributed MOF structure is surrounded by the polymer-rich phase to produce a MOF-polymer composite material. The MOF structure is homogeneously distributed in the polymer-rich phase such that the MOF-polymer composite material is a homogeneous composite material.

The method can include controlling the crystallization of the MOF structure in the homogeneous solution, for example, by controlling at least one of a crystallizing time and a crystallizing temperature, by controlling the ratio of reactants in the mother liquor, and/or by controlling the type and/or ratio of solvent, such that the MOF structure is uniform in at least one of crystal size, pore size, and morphology. The MOF-polymer composite material formed by the method described herein is characterized by a pore size distribution of the MOF structure distributed in the remainder solution which is substantially unchanged after demixing to form the polymer-rich phase, such that the MOF-polymer composite material and the MOF structure crystallized in the homogeneous solution have substantially the same pore size distribution. The metal organic framework (MOF)-polymer composite material may also be referred to herein as a MOF-polymer composite or a MOF-polymer composite material.

The method includes distributing the homogenous solution on a substrate prior to crystallization of the MOF structure, and separating the MOF-polymer composite material from the substrate after forming of the MOF-polymer composite, to provide a metal organic framework (MOF) structured object. In one example, the MOF structured object is formed as a thin object such as a film or a membrane. The substrate can be configured such that the substrate defines a net shape of the MOF structured object, which can be a thin film or membrane. In one example, the MOF structured object can be formed as a thin sheet which can be further fabricated, for example, by cutting or trimming, into a net shape film or membrane. In one example, the MOF-polymer composite thin sheet can be laminated to at least one other sheet, which can be one of another MOF-polymer composite thin sheet or a sheet of another material, to form a laminated object. The metal organic framework (MOF) structured object may also be referred to herein as a MOF structured object.

As described further herein, the homogeneous solution from which the MOF-polymer composite material is formed includes a MOF mother liquor and a polymer solution. The MOF mother liquor includes MOF reactants including a solvent, a metal salt, and an organic reactant which can be synthesized to provide an organic linker during formation of the MOF structure. The polymer solution includes a solvent and a polymer, where the polymer is soluble in the solvent. Crystallization of the MOF structure in the homogeneous solution yields a MOF structure distributed in a remainder solution, where the remainder solution is the homogeneous solution depleted by formation of the MOF structure. The remainder solution is demixed by applying an antisolvent to the remainder solution with the MOF structure distributed in the remainder solution, to form the polymer-rich phase, such that the polymer-rich phase, as it is formed, surrounds, integrates and/or encapsulates the MOF structure to form the MOF-polymer composite. As such, the MOF structure remains in the distributed state in which it was crystallized in the homogeneous solution, providing a high degree of uniformity of the MOF structure in the polymer matrix, yielding a homogeneous MOF-polymer composite material.

In one example, demixing occurs by immersing the remainder solution in the antisolvent while the MOF structure remains distributed in the remainder solution in its crystallized condition, such that the antisolvent reacts with the remainder solution to cause the polymer dissolved in the solvent to undergo a phase inversion, inverting the polymer from a solvent phase to form a non-solvent phase surrounding the MOF structure in its crystallized condition. The non-solvent phase of the polymer after inversion is referred to herein as the polymer-rich phase. Notably, the antisolvent is selected such that each of the polymer and the MOF structure is not soluble in the antisolvent. In an illustrative example, the polymer comprises polyvinylidene difluoride (PVDF) which is dissolved into a solvent comprising dimethylformamide (DMF). The mother liquor, in this example, includes a copper salt and a reactant comprising benzene-1,3,5-benzene tricarboxylic acid (H3BTC), such that upon synthesis, a copper benzene-1,3,5-tricarboxylate MOF (Cu-BTC MOF) is crystallized in the homogeneous solution. The polymer, in this example, is demixed from the remainder solution by an antisolvent comprising water. In one example, the polymer is selected from a group consisting of: poly (hexamethylenevinylene), polyoctenamer, polysulfone, poly (4-vinylphenol), Parmax™ 1200 (soluble polyphenylene), Kynar™ 2751 (PVDF rubber), poly(perfluorocyclobutane), polyvinylpyridine, carboxymethylcellulose (Na+ and Li+ salts), poly(vinylbenzyl alcohol), polystyrene, and mixtures thereof. The polymer can comprise at least one of a crystalline polymer and an amorphous polymer such that during demixing, the polymer-rich phase inverts by at least one of recrystallization and gelation.

The method of making a metal organic framework (MOF) structured object as described herein is advantaged by forming the MOF composite material from a homogeneous solution which is demixed after synthesis of the MOF structure to invert the polymer in the remainder solution, while the MOF structure remained distributed in the remainder solution, into a polymer-rich phase which surrounds and integrates the MOF structure into a polymer matrix, forming the MOF-polymer composite material. As such, the MOF-polymer composite material is formed from the homogeneous solution directly and in a continuous process which does not require removal and transport of the MOF structure from one vessel to another. Further, there is no mixing step required to mix the MOF structure into the polymer, as the MOF structure is synthesized and distributed in the remainder solution from which the polymer-rich phase is demixed. As such, fracturing and/or breakage of the MOF structure during transport and mixing is avoided, and the MOF structure remains as synthesized in the resultant MOF-polymer composite material. The uniformity, distribution, and continuity of the MOF structure as formed on the substrate in the homogeneous solution is maintained and integrated into the polymer matrix formed around the distributed MOF structure to yield a homogeneous MOF-polymer composite material which exhibits uniformity of properties and characteristics throughout the composite material. As such, a MOF structured object formed of and/or fabricated from the composite material is advantaged by uniformity of properties, including controlled pore size, crystal size and morphology.

A MOF structured object, which can be a thin object such as a membrane or film, formed by the method described herein, is advantaged by the uniform distribution of the MOF structure integrated into the MOF-polymer composite, where crystallization of the MOF structure in situ on the substrate can be controlled to produce a MOF structure having a controlled and/or predetermined size and morphology such that the polymer-rich phase as it demixes from the remainder solution surrounds the MOF structure, as it remains in situ on the substrate, to produce a smooth surface on the thin object membrane or film. As used herein, the term MOF-polymer composite thin object can refer to either or both of a membrane and a film formed of the MOF-composite material using the method described herein. Due to its encapsulation in the polymer-rich phase, the integrity, distribution, and uniformity of the MOF structure in the thin object is maintained during movement and manipulation of the MOF-polymer composite thin object, for example, during fabrication of MOF structured objects from the thin object by cutting, trimming, folding, laminating, etc. and/or during assembly of the MOF structured object with other components.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

A method of making a metal organic framework (MOF)-polymer composite material which can be formed as a macroscopically metal organic framework (MOF) structured object such as a membrane or a film, and a metal organic framework (MOF) structured object made by the method are described herein. The metal organic framework (MOF)-polymer composite material may also referred to herein as a MOF-polymer composite or a MOF-polymer composite material. The metal organic framework (MOF) structured object may also be referred to herein as a MOF structured object. The term "MOF" as used herein, is an acronym for metal organic framework.

Figure 1:
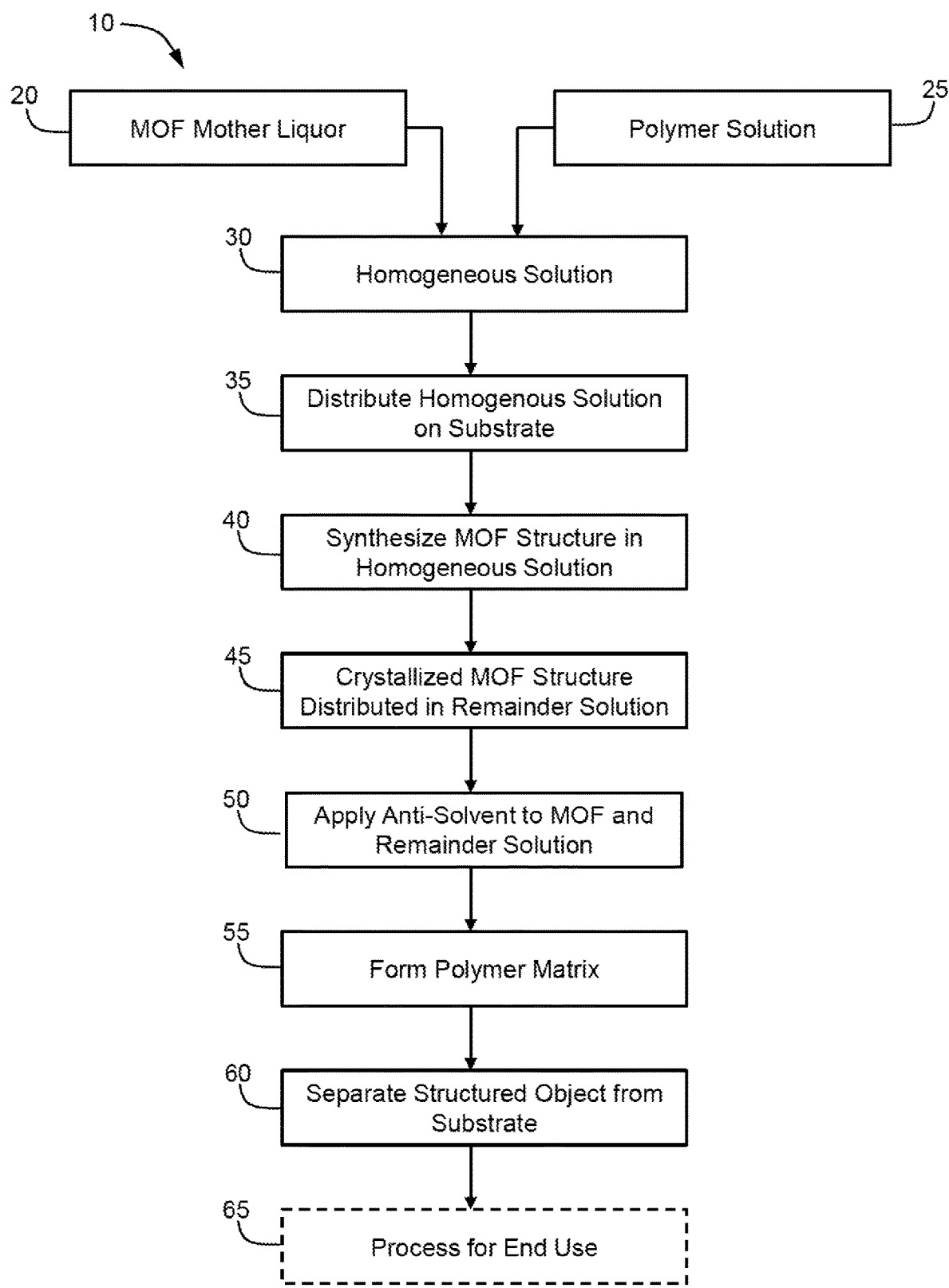
FIG. 1 schematically illustrates a method of making a metal organic framework (MOF)-polymer composite material, in accordance with the disclosure.

Referring to FIG. 1, an example method of making a metal organic framework (MOF)-polymer composite material is generally indicated at 10. The method 10 includes providing a MOF mother liquor indicated at step 20 and providing a polymer solution at step 25, which are combined at step 30 to form a homogeneous solution. The MOF mother liquor provided at step 20 includes a solvent, a metal salt, and a reactant, where the reactant can be synthesized to provide an organic linker to form organic ligands during formation of the MOF structure. In a non-limiting example, the MOF mother liquor includes a copper salt and a reactant comprising benzene-1,3,5-tricarboxyic acid (H3BTC), such that upon synthesis, a copper benzene-1,3,5-tricarboxylate MOF (Cu-BTC MOF) is crystallized in the homogeneous solution. In a non-limiting example, the solvent included in the MOF mother liquor can include a mixture of ethanol (EtOH), dimethylformamide (DMF), and water ($H_2O$) in proportions as required, when combined with the polymer solution, to synthesize the formation of the MOF structure in the homogeneous solution. The examples provided herein are illustrative, and it would be understood that other combinations of solvent, metal salt and reactant can be used to form a MOF mother liquor, that when combined with a polymer solution as described herein, can be synthesized to produce a MOF framework. A MOF framework, as that term is used herein, means a compound consisting of metal ions or clusters coordinated to organic ligands to form one-, two-, or three-dimensional structures, also referred to herein as MOF crystals. The MOF structure, as that term is used herein, means the structure which is formed by and consists of the MOF framework synthesized, via crystallization, in the homogeneous solution. The MOF structure is characterized by one or more of a crystal size distribution of the size of the MOF crystals in the MOF structure, by a pore size distribution (see FIG. 2) of the pores formed in the MOF crystals in the MOF structure, by an indicator of uniformity of distribution of the MOF crystals in the MOF structure, by the morphology of the MOF crystals, and/or by an indicator of uniformity of the morphology of the MOF crystals in the MOF structure.

The polymer solution provided at step 25 includes a solvent and a polymer, where the polymer is soluble in the solvent. In a non-limiting example, the solvent included in the polymer solution includes dimethylformamide (DMF), and the polymer includes polyvinylidene difluoride (PVDF) which is dissolved into a solvent comprising dimethylformamide (DMF). The polymer, in this example, is demixed from the remainder solution by an antisolvent comprising water ($H_2O$). In one example, the polymer is selected from a group consisting of: poly(hexamethylenevinylene), poly-octenamer, polysulfone, poly(4-vinylphenol), Parmax™ 1200 (soluble polyphenylene), Kynar™ 2751 (PVDF rubber), poly(perfluorocyclobutane), polyvinylpyridine, carboxymethylcellulose (Na+ and Li+ salts), poly(vinylbenzyl alcohol), polystyrene, and mixtures thereof. The polymer can comprise at least one of a crystalline polymer and an amorphous polymer such that during demixing, the polymer-rich phase inverts by at least one of recrystallization and gelation.

The method 10, at step 30, combines the MOF mother liquor provided at step 20 and the polymer solution provided at step 25 to form a homogeneous solution. At step 35, the homogeneous solution is distributed on a substrate, for synthesis and crystallization of the MOF structure in the homogeneous solution. The substrate is configured to retain the homogeneous solution during further processing shown at steps 40, 45, 40 and 55. In one example, the substrate can be configured as a vessel which defines the form of the MOF-polymer composite material being made. For example, the substrate can be configured to accommodate formation of the MOF-polymer composite material formed as a MOF structured object which is a thin object, such as a membrane or a film. The thin object formed from the MOF-polymer composite material described herein can be referred to herein as a MOF-polymer thin object. In one example, the substrate can be configured to form the MOF-polymer thin object as a sheet where the shape of the sheet, e.g., the perimeter of the sheet, is defined by the substrate. In another example, the substrate could be configured to form a thin sheet of a predetermined size and/or shape, where the predetermined shape can be a polygon, an ellipse, or other shape, which can be a regular or irregular shape. The substrate can be configured to form a thin object including one or more apertures, such as in a ring shape, where, for example, the ring shape of the thin object may be required for the end use of the MOF-polymer thin object. It would be understood that the examples providing herein are intended to be non-limiting, and that various substrates could be configured to retain the homogeneous solution and MOF-polymer composite material formed therefrom to form MOF structured objects of various shapes. In another example, the substrate can be configured to form the MOF-polymer thin object as a continuous sheet, e.g., a sheet of fixed width and variable length, which can be, for example, rolled onto a carrier for storage or optionally, for further processing for end use, as indicated at step 65 in FIG. 1.

Figure 2:
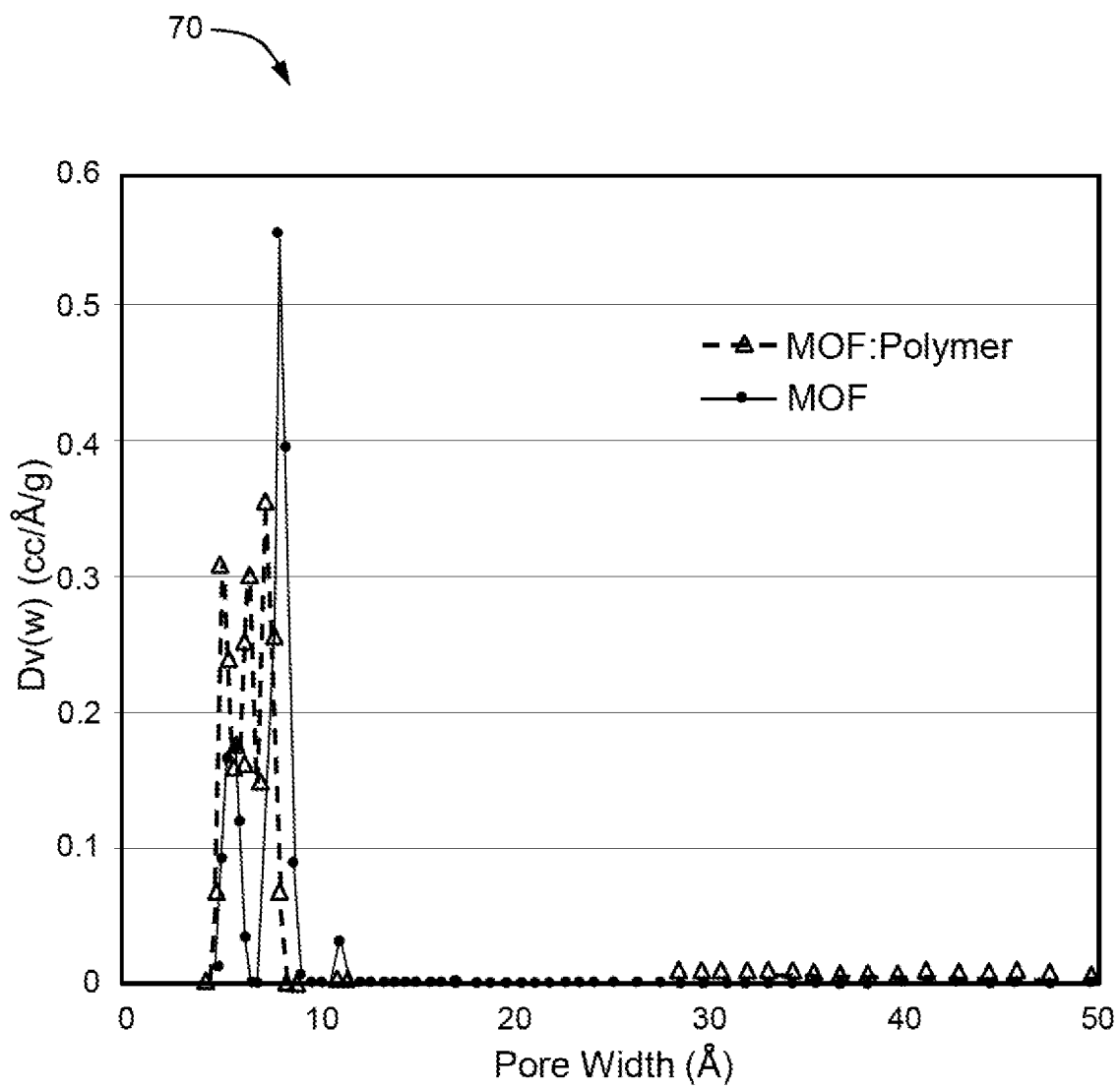
FIG. 2 schematically illustrates a pore size distribution of a MOF structure and a MOF-polymer composite material including the MOF structure.

Referring again to FIG. 1, at step 40 a MOF structure is synthesized, via crystallization of the homogeneous solution, in the homogenous solution. The method 10 can include controlling the crystallization of the MOF structure in the homogeneous solution, for example, by controlling at least one of a crystallizing time and a crystallizing temperature, such that the MOF structure is uniform in at least one of crystal size, pore size, and morphology. As used herein, the term "uniform" can mean non-random, controlled to a predetermined range less than that which would result from uncontrolled conditions or random variation, and/or consistent through in at least one of structure, properties and characteristics. In an illustrative example, the pore size distribution of the MOF structure formed in the remainder solution is uniform within a predetermined range of approximately from 5 to 9 Angstroms (Å), as shown in FIG. 2 by the graph line identified as "MOF".

At step 45, crystallization of the MOF structure in the homogeneous solution yields the MOF structure which is distributed in a remainder solution, where the "remainder solution", as that term is used herein, is the remaining homogeneous solution depleted by formation of the MOF structure. The uniform MOF structure crystallized from the homogeneous solution and distributed on the substrate remains in its as formed location and condition in the remainder solution on the substrate, during formation of the polymer-rich phase and polymer matrix at steps 50, 55, such that the MOF structure is substantially undisturbed, e.g., retains its structure, pore distribution characteristics, particle size distribution, etc. during steps 50, 55. The method 10 as described herein is therefore advantaged by not requiring removal of the MOF structure from the solution prior to formation of the MOF-polymer composite material, such that the MOF structure in situ on the substrate during formation of the surrounding polymer-rich phase is substantially less susceptible to breakage, changes in particle size, etc., and the MOF structure remains uniformly distributed in the resultant MOF-polymer composite material formed during steps 50, 55.

At step 50, the remainder solution is demixed to form a polymer-rich phase, where the distributed MOF structure is encapsulated and/or surrounded by the polymer-rich phase to produce a MOF-polymer composite material. The remainder solution is demixed at step 50 by applying an antisolvent to the remainder solution while the MOF structure remains as formed and distributed in the remainder solution, to form the polymer-rich phase, such that the polymer-rich phase, as it formed by conversion from a solvent phase to a non-solvent phase, surrounds, encapsulates, and/or integrates the MOF structure to form the MOF-polymer composite. As such, the MOF structure remains in the distributed condition in which it was crystallized in the homogeneous solution, providing a high degree of uniformity of the MOF structure in the polymer matrix, yielding the homogeneous MOF-polymer composite material. In one example, demixing occurs by immersing the MOF structure distributed in the remainder solution in the antisolvent, such that the antisolvent causes the polymer dissolved in the solvent undergo a phase inversion, inverting from a solvent phase to form a non-solvent phase, where the non-solvent phase of the polymer after inversion is referred to herein as the polymer-rich phase. Notably, the antisolvent is selected such that each of the polymer and the MOF structure is not soluble in the antisolvent.

The MOF-polymer composite material resulting at step 55 is characterized by the homogeneous distribution of the MOF structure in the polymer-rich phase, such that the resultant MOF-polymer composite material is formed as a homogeneous composite material, substantially uniform throughout in structure, properties and characteristics. In one example, the MOF structure is encapsulated in the polymer-rich phase, e.g., in the polymer matrix, such that the surface of the MOF-polymer composite is substantially defined by the polymer-rich phase and is smooth and uniform in texture. In one example, the particle size of the MOF structure and the thickness of the polymer matrix are each controlled such that the MOF particles are fully encapsulated in the polymer-rich phase, such that the MOF particles do not protrude from the surface of the resulting MOF-polymer composite material, and such that the surface finish and surface texture of the MOF-polymer composite material is defined only by the polymer-rich phase. In the example shown in FIG. 2, the MOF-polymer composite material formed by the method described herein is characterized by a pore size distribution of the MOF structure distributed in the remainder solution which is substantially unchanged after demixing to form the polymer-rich phase, such that the MOF-polymer composite material, corresponding to the graph line indicated as "MOF:Polymer" in FIG. 2, and the MOF structure distributed in the remainder solution, corresponding to the graph line indicated as "MOF" in FIG. 2, have substantially the same pore size distribution, e.g., the pore size of the MOF remains uniform within a predetermined range of approximately from 5 to 9 Angstroms (Å) after forming the MOF-polymer composite material.

At step 60, the MOF-polymer composite material is separated from the substrate to provide a MOF structured object. In one example, the substrate is configured such that the MOF structured object is a thin object, such as a film or membrane. As described previously herein, the substrate can be configured such that the substrate defines a net shape of the MOF structured object, where "net shape" as that term is used herein, is substantially the final shape of the object as it is put into use.

In an optional step 65, the MOF structured object removed from the substrate at step 60 can be further processed or fabricated for end use, for example, by cutting or trimming a net shape object from the MOF structured object. In one example, the MOF-polymer composite thin sheet can be removed from the substrate in step 60, and assembled to at least one other component, to form an assembly. In one example, the MOF structured object can be a thin object, such as a sheet, membrane, or film, which is laminated to another sheet, membrane or film, or laminated between multiple sheets, membranes, or films. The laminate formed of the MOF structured thin object can include one or more layers of the MOF-polymer composite material formed by method 10, and/or can include at least one layer of the MOF-polymer composite material formed by method 10 and at least one layer of another material.

A MOF-polymer thin object such as a membrane or film formed by the method described herein is advantaged by the uniform distribution of the MOF structure integrated and/or encapsulated into the MOF-polymer composite, where in situ crystallization of the MOF structure on the substrate can be controlled to produce a MOF structure having a controlled and/or predetermined size and morphology such that during in situ demixing of the polymer-rich phase on the substrate, the polymer-rich phase demixes from the remainder solution to surround and/or encapsulate the MOF structure to produce a smooth surface on the thin object membrane or film. The integrity, distribution, and uniformity of the MOF structure in the thin object is maintained during movement and manipulation of the MOF-polymer composite thin object, due to the integration and/or encapsulation of the MOF structure in the surrounding polymer matrix, for example, during fabrication of MOF structured objects from the thin object by cutting, trimming, folding, laminating, etc. and/or during assembly of the MOF structured object with other components.

The examples provided herein are non-limiting, and it would be understood that a MOF structured object and/or MOF-polymer composite material formed by the method described herein could be used in various different applications, inserted into an assembly, installed as a membrane, applied as a film, etc. In one example, the membrane can be an absorbing electrolyte configured as a multi-component dendrite blocking layer of a lithium metal-type battery. The MOF-polymer composite material formed by the method described herein could be configured, for example, as a MOF structured object for use in one or more of a sensing, catalysis, gas storage, separation, and/or purification process.

The method of making a metal organic framework (MOF) structured object as described herein is advantaged by forming the MOF composite material from a homogeneous solution which is demixed after synthesis of the MOF structure to invert the polymer in the remainder solution as it surrounds the MOF structure into a polymer-rich phase which surrounds and integrates the MOF structure into a polymer matrix. As such, the MOF composite material is formed directly from the homogeneous solution in a continuous process which does not require removal and transport of the MOF structure from one vessel to another. The uniformity, distribution, and continuity of the MOF structure as formed on the substrate in the homogeneous solution is maintained and integrated into the polymer matrix formed around the distributed MOF structure to yield a homogeneous MOF-polymer composite material which exhibits uniformity of properties and characteristics throughout the composite material. As such, a MOF structured object formed of and/or fabricated from the composite material is advantaged by uniformity of properties, including controlled pore size, crystal size and morphology.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method of making a metal organic framework (MOF)-polymer composite material, the method comprising:
   forming a homogeneous solution by combining a MOF liquor and a polymer solution;
   wherein the MOF liquor includes a first solvent, a metal salt, and a reactant;
   wherein the reactant provides an organic linker during formation of a MOF structure;
   synthesizing, via crystallization of the homogeneous solution, the MOF structure in the homogenous solution;
   wherein the crystallization of the MOF structure in the homogeneous solution yields the MOF structure distributed in a remainder solution; and
   demixing the remainder solution to form a polymer-rich phase;
   wherein the MOF structure is surrounded by the polymer-rich phase to produce a MOF-polymer composite material.

2. The method of claim 1, wherein:
   the polymer solution comprises a solvent and a polymer;
   the polymer is soluble in the solvent;
   demixing the remainder solution includes applying an antisolvent to the remainder solution with the MOF structure distributed in the remainder solution, to form the polymer-rich phase;
   the polymer is not soluble in the antisolvent; and
   the MOF structure is not soluble in the antisolvent.

3. The method of claim 2, wherein the antisolvent comprises water.

4. The method of claim 2, wherein the solvent comprises dimethylformamide (DMF).

5. The method of claim 2, wherein the polymer comprises polyvinylidene difluoride (PVDF).

6. The method of claim 2, wherein the polymer is selected from a group consisting of: poly(hexamethylenevinylene), polyoctenamer, polysulfone, poly(4-vinylphenol), PVDF rubber, poly(perfluorocyclobutane), polyvinylpyridine, carboxymethylcellulose, poly(vinylbenzyl alcohol), polystyrene, and mixtures thereof.

7. The method of claim 1, further comprising:
   distributing the homogenous solution on a substrate prior to crystallization of the MOF structure; and
   separating the MOF-polymer composite material from the substrate to provide a MOF structured object.

8. The method of claim 7, wherein the MOF structured object is one of a film and a membrane.

9. The method of claim 7, wherein the substrate defines a net shape of the MOF structured object.

10. The method of claim 1, wherein:
    the MOF structure is characterized by a pore size distribution; and
    the pore size distribution of the MOF structure distributed in the remainder solution is substantially unchanged after demixing to form the polymer-rich phase.

11. The method of claim 1, wherein the MOF structure is homogeneously distributed in the polymer-rich phase such that the MOF-polymer composite material is a homogeneous composite material.

12. The method of claim 1, further comprising:
    controlling the crystallization of the MOF structure in the homogeneous solution such that the MOF structure is uniform in at least one of crystal size, pore size, and morphology.

13. The method of claim 12, wherein controlling the crystallization of the MOF structure further comprises:
    controlling at least one of a crystallizing time and a crystallizing temperature.

14. The method of claim 1, wherein:
    the polymer solution comprises a solvent and a polymer;
    the polymer is soluble in the solvent; and
    during demixing, the polymer inverts from a solvent phase to form the polymer-rich phase.

15. The method of claim 14, wherein the polymer comprises at least one of a crystalline polymer and an amorphous polymer such that during demixing, the polymer-rich phase inverts by at least one of recrystallization and gelation.

16. The method of claim 1, wherein
    the polymer solution comprises:
    a second solvent, and a polymer; and
    wherein the polymer is soluble in the second solvent.

17. The method of claim 16, wherein the reactant comprises benzene-1,3,5-tricarboxylic acid (H3BTC).

18. A method of making a metal organic framework (MOF)-polymer composite material, the method comprising:
    forming a homogeneous solution comprising:
    a solvent, a metal salt, a reactant, and a polymer;
    wherein the reactant provides an organic linker during formation of a MOF structure; and
    wherein the polymer is soluble in the solvent;
    synthesizing the homogeneous solution to crystallize the MOF structure in the homogenous solution;
    wherein crystallizing the MOF structure in the homogeneous solution yields the MOF structure distributed in a remainder solution;
    applying an antisolvent to the remainder solution with the MOF structure distributed in the remainder solution, to form a polymer-rich phase;
    wherein:
    the polymer is not soluble in the antisolvent; and
    the MOF structure is not soluble in the antisolvent; and
    wherein the MOF structure is integrated into the polymer-rich phase during forming of the polymer-rich phase to produce a MOF-polymer composite material.

19. The method of claim 18, further comprising:
    distributing the homogenous solution on a substrate prior to crystallization of the MOF structure; and
    separating the MOF-polymer composite material from the substrate to provide a MOF structured object;
    wherein the MOF structured object is one of a film and a membrane.

20. A metal organic framework (MOF)-polymer composite material prepared by a process comprising the steps of:
    forming a homogeneous solution by combining a MOF liquor and a polymer solution;
    wherein the MOF liquor includes a first solvent, a metal salt, and a reactant;
    wherein the reactant provides an organic linker during formation of a MOF structure;
    synthesizing, via crystallization of the homogeneous solution, the MOF structure in the homogenous solution;
    wherein the crystallization of the MOF structure in the homogeneous solution yields the MOF structure distributed in a remainder solution;
    demixing the remainder solution to form a polymer-rich phase;

wherein the MOF structure is surrounded by the polymer-rich phase to produce a MOF-polymer composite material;

wherein the polymer-rich phase is configured as one of a membrane and a film formed of the MOF-polymer composite material; and wherein the MOF structure distributed in the remainder solution and in the one of the membrane and film formed of the MOF-polymer composite material is characterized by one of:
  substantially the same pore size distribution; and
  substantially the same crystal size distribution; and
    wherein the pore size distribution of the MOF structure is within a range of from 5 to 9 Angstroms.

* * * * *